United States Patent
Kim et al.

(10) Patent No.: US 9,408,234 B2
(45) Date of Patent: Aug. 2, 2016

(54) METHOD FOR TRANSMITTING DATA BY USING REVERSE ORDER IMPLIED INFORMATION OBTAINED BY COMPETITION BY MEANS OF DISTRIBUTED COORDINATION FUNCTION IN WIRELESS LAN, AND WIRELESS COMMUNICATION DEVICE FOR TRANSMITTING DATA BY USING THE SAME

(71) Applicant: POSTECH ACADEMY-INDUSTRY FOUNDATION, Pohang-si, Gyeongsangbuk-do (KR)

(72) Inventors: Chee Ha Kim, Pohang-si (KR); Hyeon Mok Ko, Pohang-si (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 25 days.

(21) Appl. No.: 14/417,591

(22) PCT Filed: May 13, 2013

(86) PCT No.: PCT/KR2013/004225
§ 371 (c)(1),
(2) Date: Jan. 27, 2015

(87) PCT Pub. No.: WO2014/017735
PCT Pub. Date: Jan. 30, 2014

(65) Prior Publication Data
US 2015/0215966 A1    Jul. 30, 2015

(30) Foreign Application Priority Data

Jul. 27, 2012   (KR) .......................... 10-2012-0082556
Oct. 29, 2012   (KR) .......................... 10-2012-0120472

(51) Int. Cl.
*G08C 17/00*      (2006.01)
*H04W 4/00*      (2009.01)
(Continued)

(52) U.S. Cl.
CPC .......... *H04W 74/0816* (2013.01); *H04W 84/12* (2013.01)

(58) Field of Classification Search
CPC . H04L 12/4013; H04L 47/10; H04L 41/5019;
H04W 56/00; H04W 74/02; H04W 52/42;
H04W 74/0808; H04W 74/06
See application file for complete search history.

(56) References Cited

U.S. PATENT DOCUMENTS

2002/0071448 A1    6/2002   Cervello et al.
2002/0154653 A1*  10/2002   Benveniste ......... H04L 12/4013
                                                         370/447
(Continued)

FOREIGN PATENT DOCUMENTS

KR    10-2004-0106920    12/2004
KR    10-2007-0101018    10/2007
KR    10-1162709          7/2012

OTHER PUBLICATIONS

International Search Report for International Application No. PCT/KR2013/004225, dated Sep. 5, 2013.

*Primary Examiner* — Melanie Jagannathan
(74) *Attorney, Agent, or Firm* — Kile Park Reed & Houtteman PLLC

(57) ABSTRACT

According to the present invention, collision and a back-off slot in a competition by means of DCF can be significantly reduced, and a throughput higher than conventional DCFs can be provided. Also, overhead due to additional control messages is eliminated by reverse order implied information operating in a distributed manner in terminals, and communication with conventional terminals is enabled even in a wireless network using Aps or the DCF.

10 Claims, 3 Drawing Sheets

(51) Int. Cl.
*H04J 3/16* (2006.01)
*H04W 74/08* (2009.01)
*H04W 84/12* (2009.01)

(56) References Cited

U.S. PATENT DOCUMENTS

| | | | | |
|---|---|---|---|---|
| 2002/0163933 A1* | 11/2002 | Benveniste | ............ | H04L 47/10 370/465 |
| 2003/0012166 A1* | 1/2003 | Benveniste | ........... | H04W 56/00 370/338 |
| 2003/0086437 A1* | 5/2003 | Benveniste | ............ | H04L 47/10 370/461 |
| 2003/0174690 A1* | 9/2003 | Benveniste | ........... | H04W 74/02 370/350 |
| 2005/0058151 A1* | 3/2005 | Yeh | ........................ | H04W 52/46 370/445 |
| 2012/0224484 A1* | 9/2012 | Babiarz | ................ | H04L 41/5019 370/235 |
| 2013/0051335 A1* | 2/2013 | Adachi | ............ | H04W 74/0808 370/329 |
| 2015/0009879 A1* | 1/2015 | Kim | ...................... | H04W 74/06 370/311 |

* cited by examiner

METHOD FOR TRANSMITTING DATA BY USING REVERSE ORDER IMPLIED INFORMATION OBTAINED BY COMPETITION BY MEANS OF DISTRIBUTED COORDINATION FUNCTION IN WIRELESS LAN, AND WIRELESS COMMUNICATION DEVICE FOR TRANSMITTING DATA BY USING THE SAME

TECHNICAL FIELD

The present invention relates to data transmission using wireless LAN, and more particularly, to a method for transmitting data by using reverse order implied information obtained by competition by means of distributed coordination function (hereafter, referred to as "DCF"), which grants a specific function to DEF corresponding to a media access control method which is basically used in a wireless LAN, and implements a higher throughput than the DCF, and a wireless communication device for transmitting data by using the same.

BACKGROUND

Recently, the IEEE 802.11 wireless LAN has been widely used for wireless Internet access due to simple installation and low cost. Currently, the IEEE 802.11 wireless LAN defines two different media access control methods.

A basic access method uses a distributed coordination function (DCF) which is a general carrier sense multiple access/non collision acknowledgement method. The DFC is a rule which is applied when a wireless medium is accessed through a competition, and may be used for both of an ad-hoc network environment and an infrastructured network environment.

Furthermore, a medium access control method called a point coordination function (PCF) based on polling may be selectively used.

A wireless network has a broadcasting property. When channels in the same band are used, two terminals cannot transmit data at the same time. When two or more terminals transmit data at the same time, collision may occur, and all transmissions may fail.

When the conventional DCF is applied, three kinds of inter-frame spaces (IFS), that is, a short inter-frame space (SIFS), a PCF inter-frame space (PIFS), and a DCF inter-frame space (DIFS) may be used to implement the IEEE 802.11 medium access control method.

The IFS represents a minimum waiting time which is necessarily required until a next frame is transmitted after one frame is transmitted. The relationship among the SIFS, the PIFS, and the DIFS may be set to SIFS<PIFS<DIFS. Since the SIFS is the shortest, the SIFS is used for communication having the highest priority.

Hereafter, a general method for stochastically avoiding a collision which occurs in a wireless environment, using the DCF, will be described as follows.

The DCF uses a binary exponential back-off method, in order to avoid a collision between transmission terminals and to prevent a specific terminal from successively occupying a channel. The binary exponential back-off method provides a delay time until a transmission is retried, when data transmission signals on a transmission medium collide with each other in a wireless LAN, thereby reducing the probability of successive collision.

Before transmitting data, all terminals check whether a transmission medium is occupied by another terminal. At this time, when the transmission medium is not used during the DIFS, a terminal considers that the transmission medium is idle, and immediately transmits data. Another terminal receiving the data immediately transmits an ACK frame after a predetermined time SIFS, and informs the terminal that the transmission was successfully performed. The terminal having succeeded in transmission preferentially selects a backoff number as an arbitrary value smaller than a contention window, regardless of whether the terminal still have data to transmit, and then starts back off.

The SIFS has a smaller value than the DIFS, and prevents transmission of another terminal from interfering with transmission of an ACK frame. When no ACK frame is received, the terminal considers that the transmission failed, and doubles the transmission window. The initial contention window is set to CWmin, and the maximum size of the transmission window is set to CWMax. When transmission succeeds, the transmission window may be reset to CWmin.

When the transmission medium is occupied by another terminal, that is, when the transmission medium is busy, the corresponding terminal selects the backoff number as an arbitrary value smaller than the contention window. At this time, when the transmission medium is not used during the DIFS, the terminal considers that the transmission medium is idle, and starts back off.

When transmission of another terminal is not performed during a predetermined slot time, the terminal decreases the backoff number by one. When the backoff number becomes 0, the terminal transmits data. When the terminal recognizes transmission of another terminal, the back off is stopped.

Then, when the transmission medium is idle during the DIFS, the back off is resumed.

Then, when the backoff number becomes 0 and the transmission medium is idle, the terminal starts transmission.

The conventional DCF has been necessarily employed as a medium access control method of the IEEE 802.11 wireless LAN. In general, however, the conventional DCF exhibits low performance. In particular, as the number of terminals increases, collision frequently occurs. Furthermore, unused back-off slots cause bandwidth waste. Thus, the conventional DCF has a low transmission rate.

In order to solve the above-described problem, various methods have been proposed. However, in a general competition-based distributed medium access control method, a collision and an unused back-off slot are in a trade-off relation. Thus, when one is intended to be reduced, the other is increased. Therefore, such an access method has limitation in improving performance to a desired level.

DISCLOSURE

Technical Problem

An embodiment of the present invention is directed to a method for transmitting data by using reverse order implied information obtained by competition by means of distributed coordination function (DCF) in a wireless LAN, which is capable of improving efficiency of the DCF corresponding to a media access control method which is basically used in the IEEE 802.11 wireless LAN.

Another embodiment of the present invention is directed to a wireless communication device for transmitting data by using the method for transmitting data by using reverse order implied information obtained by competition by means of a DCF in a wireless LAN.

Technical Solution

In an embodiment, a method for transmitting data by using reverse order implied information obtained by competition by means of distributed coordination function (DCF) in a wireless LAN may include: succeeding, by a first terminal, in data transmission through a competition based on DCF in the wireless LAN; recognizing, by a second terminal, the first terminal having succeeded in data transmission; succeeding, by the second terminal, in data transmission through the competition based on DCF at a continuous transmission round after the first terminal succeeds in data transmission at one transmission round, wherein one transmission round is set to a period from the moment at which a terminal starts a competition after a DCF inter-frame space (DIFS) for transmission to the moment at which a transmission medium starts to idle during a DIFS for a next competition after data transmission is successfully performed; identifying, by the second terminal, the first terminal as an immediate predecessor; and transmitting, by the second terminal, data without the competition based on DCF, when the first terminal succeeds in data transmission through the competition based on DCF.

When identifying the first terminal as an immediate predecessor, the second terminal cannot participate in a competition based on DCF. Furthermore, when the second terminal identifies the first terminal as an immediate predecessor, a backoff number of the second terminal is selected as a value between a minimum contention window value and a value obtained by doubling the minimum contention window value and subtracting 1 from the doubled minimum contention window value. Furthermore, terminals having immediate predecessors may be given only one transmission opportunity at one transmission round. Furthermore, when RTS/CTS options are activated and used together, a terminal succeeding in data transmission through the RTS/CTS options is handled in the same manner as a terminal succeeding in data transmission through the competition based on DCF.

In an embodiment, a wireless communication device using the method for transmitting data by using reverse order implied information obtained by competition by means of DCF in a wireless LAN may include: an immediate predecessor detection unit configured to detect a first terminal which participates in a competition based on DCF in a wireless LAN, and succeeds in data transmission through the competition based on DCF; an immediate predecessor identification unit configured to identify the detected first terminal as an immediate predecessor, when the first terminal participates in the competition based on DCF again, acquires a channel use right, and succeeds in data transmission, at a continuous transmission round after the first terminal succeeds in data transmission; and a non-competition data transmission unit configured to transmit data without a competition based on DCF, when the identified immediate predecessor succeeds in data transmission through the competition based on DCF.

Advantageous Effects

In accordance with the embodiments of the present invention, the method for transmitting data by using reverse order implied information obtained by competition by means of a DCF in a wireless LAN and the wireless communication device using the same may significantly reduce backoff slots and collisions using the conventional DCF, and realize higher throughput than the DCF.

Furthermore, since ordering implicit information can be distributed and applied to terminals, there is no overhead caused by an additional control message. Furthermore, since a simple function is added to the IEEE 802.11 DCF which is already defined as the standard, the method and device may provide compatibility with existing terminals in access points (AP) which are widely installed or wireless networks using the IEEE 802.11 DCF.

BEST MODE FOR THE INVENTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the embodiments of the present invention, all terminals compete with each other through the IEEE 802.11 DCF, in order to transmit data. At this time, all of the terminals may recognize transmissions which are being performed, due to the nature of wireless communication. Each of terminals which are awake, that is, each of terminals which are not in a power saving mode provided through the IEEE 802.11 to intentionally reduce energy consumption may receive a frame and decode the MAC (Medium Access Control) header of the frame, in order to determine whether data which are being transmitted are provided for the terminal. Then, when a destination described in the header corresponds to the terminal, the terminal may receive the entire frame and pass the received frame to an upper layer. Otherwise, the terminal may discard the frame. As such, the embodiments of the present invention are based on the supposition that all terminals recognize transmissions which are being performed.

In order to reduce waste caused by an excessive number of idle slots and collisions and waste caused by competition, each terminal only has to determine when to transmit data. For example, a terminal B may always transmit data after a terminal A, and a terminal C may then transmit data. After each terminal successfully transmits data, another terminal may reserve a right to occupy a transmission medium.

Conventionally, however, a control message producing excessive overhead has been used for such a reservation, or suppositions which cannot be accepted in a real world have been set. In the embodiments of the present invention, implicit backward ordering information may be used to make a transmission reservation, without any additional overhead. For this operation, terminals may compete to acquire a transmission medium use right, using the IEEE 802.11 DCF, and only one terminal may normally transmit data at any one time point, due to the nature of wireless communication. That is, the order of terminals which try transmission and succeed in transmission may be determined. In the embodiment of the present invention, such order information may be used.

In the embodiments of the present invention, implicit backward ordering information for reserving a transmission order without an excessive number of idle slots or collisions and any overheads may be defined as a process of identifying an immediate predecessor.

Figure 1:
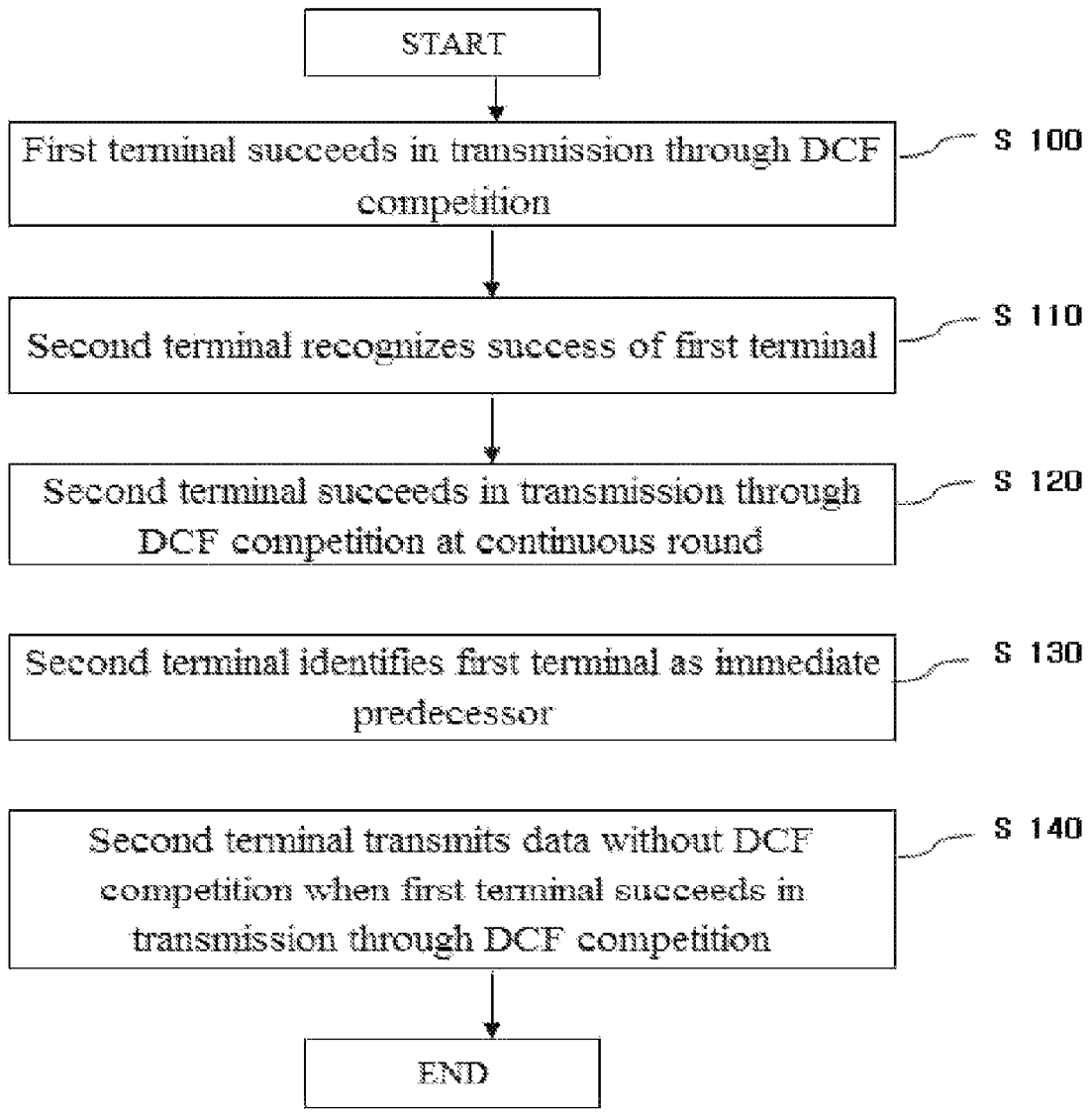
FIG. 1 is a flowchart illustrating a method for transmitting data by using reverse order implied information obtained by competition by means of distributed coordination function (DCF) in a wireless LAN in accordance with an embodiment of the present invention.

FIG. 1 is a flowchart illustrating a method for transmitting data by using reverse order implied information obtained by competition by means of distributed coordination function (DCF) in a wireless LAN in accordance with an embodiment of the present invention.

Figure 2:
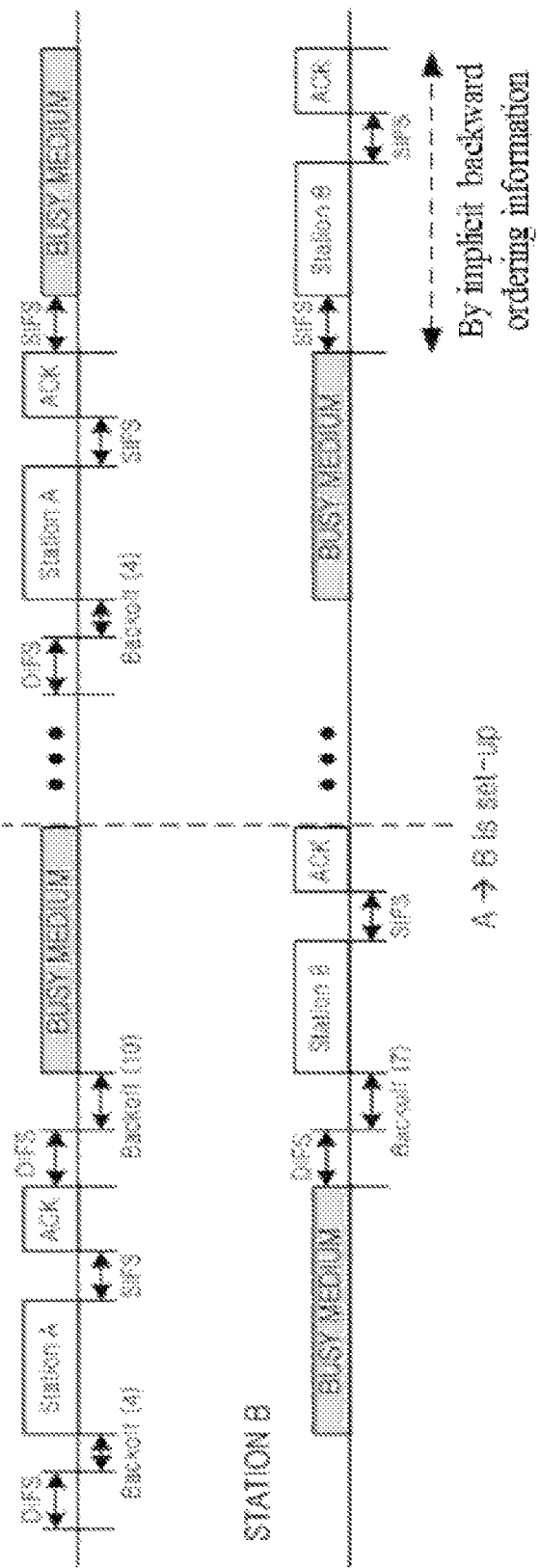
FIG. 2 illustrates an example of the method for transmitting data by using reverse order implied information obtained by competition by means of DCF in a wireless LAN in accordance with the embodiment of the present invention.

FIG. 2 is an example of the method for transmitting data by using reverse order implied information obtained by competition by means of DCF in a wireless LAN in accordance with the embodiment of the present invention.

Referring to FIGS. 1 and 2, the method for transmitting data by using reverse order implied information obtained by competition by means of DCF in a wireless LAN in accordance with the embodiment of the present invention will be described.

First, a first terminal may succeed in data transmission through a competition based on DCF in the wireless LAN, at step S100. Then, a second terminal may recognize the first terminal having succeeded in data transmission at step S110.

One transmission round may be set to a period from the moment at which a terminal starts a competition after a DIFS for transmission to the moment at which a transmission medium starts to idle during a DIFS for the next competition after data transmission is successfully performed. After the first terminal succeeds in data transmission at one transmission round, the second terminal succeeds in data transmission through the competition based on DCF at the continuous transmission round, at step S120. The second terminal may identify the first terminal as an immediate predecessor at step S130.

Referring to FIG. 2, steps S100 to S130 will be described in more detail. When the first terminal is set to a terminal A and the second terminal is set to a terminal B, the terminal A may succeed in transmission through a DCF competition. Then, the terminal B may succeed in data transmission through the DCF competition. More specifically, the terminal A may wait for a time corresponding to backoff (4) after a DIFS, acquire a channel use right 200 to transmit data, and succeed in transmission by receiving an ACK frame 202 after an SIFS. At this time, while the terminal A acquires the channel use right 200, the terminal B may stay in BUSY MEDIUM state 206. Then, when a DIFS elapses after the terminal A succeeds in transmission, the terminal B may decrease the backoff number. When a channel is empty until the backoff number becomes 0 from 7, the terminal B may acquire a channel use right 208 to start data transmission. Then, when the terminal B receives an ACK frame 210, data transmission is successfully completed. On the other hand, the terminal A may stay in BUSY MEDIUM state 204, until the terminal B completes data transmission by receiving the ACK frame 210 after acquiring the channel use right 208.

At this time, the terminal B may recognize the terminal A having succeeded in data transmission immediately before the terminal B succeeds in data transmission. In this case, the terminal B may identify the terminal A as an immediate predecessor thereof.

After the first terminal is identified as an immediate predecessor of the second terminal, the first terminal may participate in a competition based on DCF in order to transmit data again, acquire a channel use right, and succeed in data transmission. Then, since the first terminal is an immediate predecessor of the second terminal, the second terminal may transmit data according to reverse ordering implicit information, without a competition based on DCF, at step S140. When identifying the first terminal as an immediate predecessor, the second terminal may be controlled to not participate in a competition based on DCF. Furthermore, when the second terminal identifies the first terminal as an immediate predecessor, the backoff number of the second terminal may be selected as a value between the minimum contention window value CWmin and a value 2CWmin-1 obtained by doubling the minimum contention window value and subtracting 1 from the doubled minimum contention window value. Furthermore, terminals having immediate predecessors may have only one transmission opportunity at one transmission round. Furthermore, when RTS/CTS options are activated and used together, a terminal which succeeds in data transmission through the RTS/CTS options may be handled in the same manner as a terminal which succeeds in data transmission through a competition based on DCF.

Referring to FIG. 2, step S140 will be described in detail as follows. When the terminal A corresponding to the first terminal succeeds in data transmission through a DCF competition, the terminal B corresponding to the second terminal may have an additional transmission opportunity through implicit order information, without a DCF competition.

More specifically, when a predetermined time elapses after the terminal B identifies the terminal A as an immediate predecessor thereof, the terminal A may wait until the backoff number becomes 0, after a DIFS. Referring to FIG. 2, when the channel is empty until backoff (4) becomes backoff (0), that is, until the backoff number decreases from 4 to 0, the terminal A may acquire a channel use right 250 to transmit data, and successfully complete transmission by receiving an ACK frame 252.

The terminal B may stay in BUSY MEDIUM state 256 until the terminal A acquires the channel use right 250 and completes transmission. Then, when the terminal A identified as an immediate predecessor succeeds in data transmission, the terminal B may acquire a channel use right 258 immediately after an SIFS, without a DCF competition. Then, the terminal B may transmit data, and successfully complete transmission by receiving an ACK frame 260.

In the embodiments of the present invention, it is important that the series of processes do not require any additional functions and any additional control messages.

During theses processes, terminals having immediate predecessors cannot participate in a DCF competition, on principle. However, when an immediate predecessor does not participate in a DCF competition because the immediate predecessor has nothing to transmit, the successor may not transmit data forever. In order to prevent such a case, terminals having identified their immediate predecessors may select a backoff number between CWmin and 2CWmin-1. When a terminal succeeds in data transmission without a competition due to an immediate predecessor thereof, the terminal may select the next backoff number as described above. In this way, although the immediate predecessor does not participate in a DCF competition because the immediate predecessor has no data to transmit, the terminal does not miss an opportunity of transmission forever.

An exceptional situation may occur when two terminals always have data to transmit and identify each other as immediate predecessors thereof. In this case, a transmission medium is always occupied by the two terminals, and other terminals cannot participate in this competition.

In order to prevent such a situation, one logical transmission round may be defined. The transmission round may refer to two successive DIFSs. In FIG. 2, one round is defined as a period from the moment at which the terminal A starts a competition after a DIFS for transmission to the moment at which the transmission medium starts to idle during a DIFS for another competition after data transmission is successfully completed. At this time, all terminals having immediate predecessors may have only one transmission opportunity at one transmission round. When a terminal has two or more transmission opportunities, the terminal does not follow an immediate predecessor thereof any more.

In the embodiments of the present invention, RTS/CTS options may be used without any problems. According to the IEEE 802.11 standard, the use of RTS/CTS options is recommended as one of methods for solving a hidden terminal problem. That is, when the RTS/CTS options are activated and used together, a terminal succeeding in data transmission through the RTS/CTS options may be handled in the same manner as a terminal succeeding in data transmission through a competition based on DCF.

Figure 3:
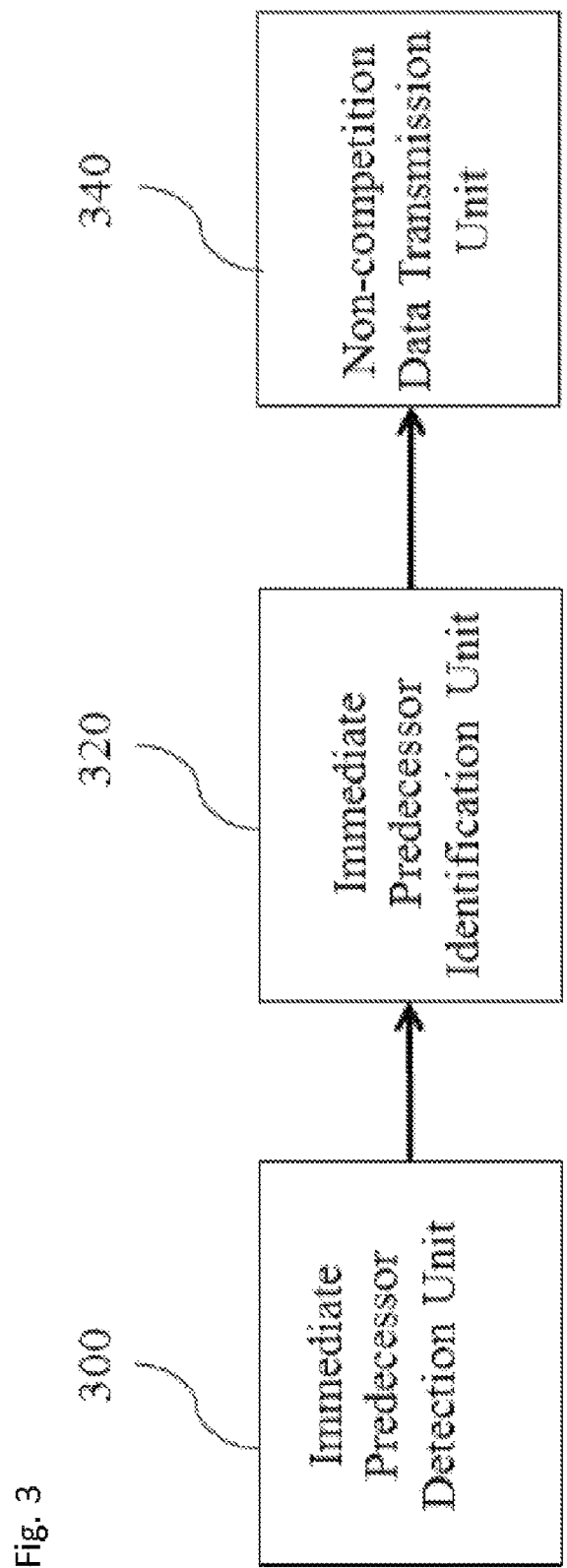
FIG. 3 illustrates a wireless communication device for transmitting data by using the method for transmitting data by using reverse order implied information obtained by competition by means of DCF in a wireless LAN in accordance with the embodiment of the present invention.

FIG. 3 illustrates an example of a wireless communication device for transmission data by using the method for transmitting data by using reverse order implied information obtained by competition by means of DCF in a wireless LAN in accordance with the embodiment of the present invention.

The wireless communication in accordance with the embodiment of the present invention may include an immediate predecessor detection unit 300, an immediate predecessor identification unit 320, and a non-competition data transmission unit 340.

The immediate predecessor detection unit 300 may detect a first terminal which participates in a competition based on DCF in a wireless LAN, and succeeds in data transmission through the competition based on DCF.

When the first terminal participates in the DCF competition, acquires a channel use right through the DCF competition, and succeeds in data transmission at a continuous transmission round after succeeding in data transmission, the immediate predecessor identification unit 320 may identify the first terminal as an immediate predecessor.

When the immediate predecessor identified by the immediate predecessor identification unit 320 succeeds in data transmission through the DCF competition, the non-competition data transmission unit 340 may transmit data after the data transmission of the first terminal, without a competition based on DCF.

At this time, when the first terminal is identified as an immediate predecessor, a terminal having an immediate predecessor may be controlled to not participate in the DCF competition. Furthermore, when the immediate predecessor identification unit 320 identifies the first terminal as an immediate predecessor, a backoff number may be selected as a value between the minimum contention window value CWmin and the value 2CWmin-1 obtained by doubling the minimum contention window value and subtracting 1 from the doubled minimum contention window value. Furthermore, terminals having immediate predecessors may have only one transmission opportunity at one transmission round. Furthermore, when the RTS/CTS options are activated and used together, a terminal succeeding in data transmission through the RTS/CTS options may be handled in the same manner as a terminal succeeding in data transmission through a competition based on DCF.

Furthermore, the wireless communication device may include all kinds of communication devices which perform wireless communication, and representative examples of the wireless communication device may include mobile communication devices including smart phones.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present invention has been described with respect to the specific embodiments, it will be apparent to those skilled in the art that various changes and modifications may be made without departing from the spirit and scope of the invention as defined in the following claims.

The invention claimed is:

1. A method for transmitting data by using reverse order implied information obtained by competition by means of distributed coordination function (DCF) in a wireless LAN, comprising:
   succeeding, by a first terminal, in data transmission through a competition based on DCF in the wireless LAN;
   recognizing, by a second terminal, the first terminal having succeeded in data transmission;
   succeeding, by the second terminal, in data transmission through the competition based on DCF at a continuous transmission round after the first terminal succeeds in data transmission at one transmission round, wherein one transmission round is set to a period from the moment at which a terminal starts a competition after a DCF inter-frame space (DIFS) for transmission to the moment at which a transmission medium starts to idle during a DIFS for a next competition after data transmission is successfully performed;
   identifying, by the second terminal, the first terminal as an immediate predecessor; and
   transmitting, by the second terminal, data without the competition based on DCF, when the first terminal succeeds in data transmission through the competition based on DCF.

2. The method of claim 1, wherein when identifying the first terminal as an immediate predecessor, the second terminal cannot participate in a competition based on DCF.

3. The method of claim 1, wherein when the second terminal identifies the first terminal as an immediate predecessor, a backoff number of the second terminal is selected as a value between a minimum contention window value and a value obtained by doubling the minimum contention window value and subtracting 1 from the doubled minimum contention window value.

4. The method of claim 1, wherein terminals having immediate predecessors are given only one transmission opportunity at one transmission round.

5. The method of claim 1, wherein when RTS/CTS options are activated and used together, a terminal succeeding in data transmission through the RTS/CTS options is handled in the same manner as a terminal succeeding in data transmission through the competition based on DCF.

6. A wireless communication device comprising:
   an immediate predecessor detection unit configured to detect a first terminal which participates in a competition based on DCF in a wireless LAN, and succeeds in data transmission through the competition based on DCF;
   an immediate predecessor identification unit configured to identify the detected first terminal as an immediate predecessor, when the first terminal participates in the competition based on DCF again, acquires a channel use right, and succeeds in data transmission, at a continuous transmission round after the first terminal succeeds in data transmission; and a non-competition data transmission unit configured to transmit data without a competition based on DCF, when the identified immediate predecessor succeeds in data transmission through the competition based on DCF.

7. The wireless communication device of claim 6, wherein when the first terminal is identified as an immediate predecessor, terminals having immediate predecessors cannot participate in a competition based on DCF.

8. The wireless communication device of claim 6, wherein when the immediate predecessor identification unit identifies the first terminal as an immediate predecessor, a backoff number is selected as a value between a minimum contention window value and a value obtained by doubling the minimum contention window value and subtracting 1 from the doubled minimum contention window value.

9. The wireless communication device of claim 6, wherein terminals having immediate predecessors are given only one transmission opportunity at one transmission round.

10. The wireless communication device of claim 6, wherein when RTS/CTS options are activated and used together, a terminal succeeding in data transmission through the RTS/CTS options is handled in the same manner as a terminal succeeding in data transmission through the competition based on DCF.

\* \* \* \* \*